US011849696B2

(12) United States Patent
Bähler

(10) Patent No.: US 11,849,696 B2
(45) Date of Patent: Dec. 26, 2023

(54) DEVICE AND METHOD FOR CONTINUOUSLY CONVEYING AND PLASTICIZING CHEESE CURD

(71) Applicant: SULBANA AG, Elsau (CH)

(72) Inventor: Balz Bähler, Elgg (CH)

(73) Assignee: SULBANA AG, Elsau (CH)

( * ) Notice: Subject to any disclaimer, the term of this patent is extended or adjusted under 35 U.S.C. 154(b) by 344 days.

(21) Appl. No.: 17/279,925

(22) PCT Filed: Sep. 28, 2018

(86) PCT No.: PCT/CH2018/000039
§ 371 (c)(1),
(2) Date: Mar. 25, 2021

(87) PCT Pub. No.: WO2020/061717
PCT Pub. Date: Apr. 2, 2020

(65) Prior Publication Data
US 2021/0392843 A1    Dec. 23, 2021

(51) Int. Cl.
*A01J 25/00*          (2006.01)
*B01F 27/721*         (2022.01)
(Continued)

(52) U.S. Cl.
CPC ........... *A01J 25/008* (2013.01); *A01J 25/002* (2013.01); *A23C 19/0684* (2013.01);
(Continued)

(58) Field of Classification Search
CPC ...... A01J 25/002; A01J 25/007; A01J 25/008; A01J 25/12; B01F 27/00; B01F 27/60;
(Continued)

(56) References Cited

U.S. PATENT DOCUMENTS 3,559,561 A * 2/1971 Page ................. A23J 3/227
                                              100/145
3,891,192 A * 6/1975 Bontempi ............ B01F 27/724
                                              366/90
(Continued)

FOREIGN PATENT DOCUMENTS

EP    2168429 A1    3/2010
EP    2168429 B1    1/2011
(Continued)

OTHER PUBLICATIONS

English translation of the International Search Report dated Jun. 26, 2019 for parent application No. PCT/CH2018/000039.
(Continued)

*Primary Examiner* — Drew E Becker
*Assistant Examiner* — Austin Parker Taylor
(74) *Attorney, Agent, or Firm* — J-TEK LAW PLLC; Jeffrey D. Tekanic; Scott T. Wakeman

(57) ABSTRACT

A device (1) for continuously conveying and plasticising cheese curd includes a housing (2) having an elongate chamber (3) with inlet and openings (5, 6). At least one pair of oppositely-driven conveying shafts (4.1, 4.2) is arranged in the elongate chamber such the axes of rotation (18.1, 18.2) of the shafts extend in parallel in the longitudinal direction of the chamber. The conveying shafts have interleaved helical structures (19.1, 19.2) for axially conveying the cheese curd from the inlet opening to the outlet opening. A heating device (9.1, 17) heats at least part of the shaft(s) and at least part of an inner surface of the chamber. At least one entraining device is designed such that at least part of the cheese curd to be conveyed and plasticised is also transported around the two conveying shafts.

20 Claims, 8 Drawing Sheets

(51) Int. Cl.
*B01F 35/93* (2022.01)
*A23C 19/068* (2006.01)
*B01F 101/11* (2022.01)
*B01F 35/90* (2022.01)

(52) U.S. Cl.
CPC ............ *B01F 27/721* (2022.01); *B01F 35/93* (2022.01); *B01F 2035/99* (2022.01); *B01F 2101/11* (2022.01)

(58) Field of Classification Search
CPC .............. B01F 27/72–726; B01F 35/93; B01F 2101/11; B01F 2035/99; A23C 19/00; A23C 19/02; A23C 19/024; A23C 19/0684
USPC ......................................... 426/516, 518, 519
See application file for complete search history.

(56) References Cited

U.S. PATENT DOCUMENTS

| | | | |
|---|---|---|---|
| 4,054,271 A | | 10/1977 | Lanzillo |
| 4,091,721 A | * | 5/1978 | Cosmi ................... A01J 25/008 99/453 |
| 4,226,888 A | * | 10/1980 | Siecker .............. A23C 19/0684 426/582 |
| 5,125,329 A | * | 6/1992 | Tomatis .................. A01J 25/06 99/452 |
| 5,186,539 A | * | 2/1993 | Manser ................... A23L 7/109 366/85 |
| 5,358,327 A | * | 10/1994 | Derezinski ................ B29B 7/46 425/207 |
| 8,221,816 B1 | | 7/2012 | Leffelman |
| 8,764,429 B1 | * | 7/2014 | Voyatzakis .............. F26B 7/005 425/332 |
| 2003/0169636 A1 | * | 9/2003 | Kimura ................. B29C 48/687 366/97 |
| 2003/0200873 A1 | * | 10/2003 | Abler .................... A01J 25/002 99/452 |
| 2004/0096564 A1 | * | 5/2004 | Merrill ............... A23C 19/0684 426/582 |
| 2009/0117248 A1 | | 5/2009 | Smith et al. |
| 2011/0256288 A1 | * | 10/2011 | Isenberg ................ A23C 3/031 426/520 |
| 2015/0296739 A1 | * | 10/2015 | Nelles .................... B01F 35/95 426/511 |

FOREIGN PATENT DOCUMENTS

| | | |
|---|---|---|
| EP | 2473028 B1 | 8/2013 |
| WO | 2006026811 A2 | 3/2006 |
| WO | 2015164391 A1 | 10/2015 |

OTHER PUBLICATIONS

English translation of the Written Opinion of the International Searching Authority for parent application No. PCT/CH2018/000039.

* cited by examiner

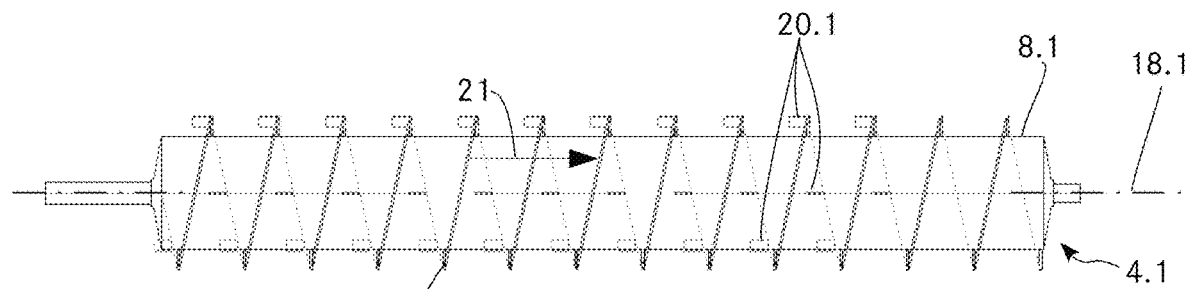
Fig. 2b
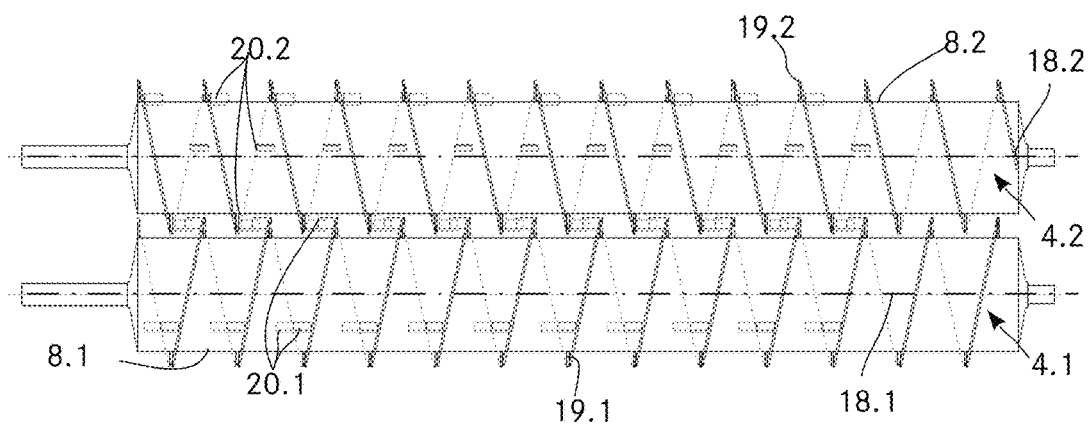
Fig. 2a
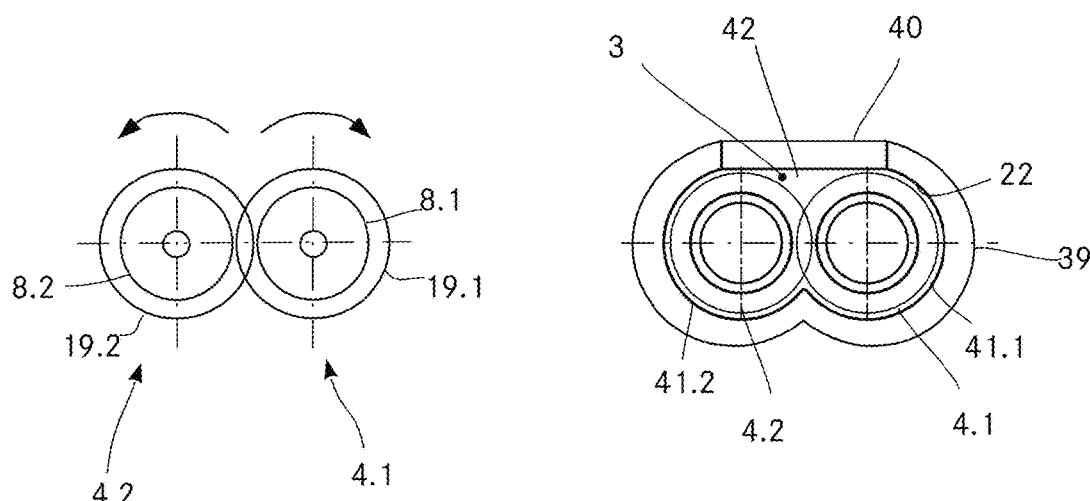
Fig. 2c
Fig. 2d

DEVICE AND METHOD FOR CONTINUOUSLY CONVEYING AND PLASTICIZING CHEESE CURD

CROSS-REFERENCE

This application is the US national stage of International Patent Application No. PCT/CH2018/000039 filed on Sep. 28, 2018.

TECHNICAL FIELD

The invention generally relates to a device for continuously conveying and plasticizing cheese curd, in particular for the production of pasta filata cheese. The invention also generally relates to a method for continuously conveying and plasticizing cheese curd, in particular for pasta filata cheese.

BACKGROUND OF THE INVENTION

Installations for continuously conveying and plasticizing cheese curd, in particular also for the production of pasta filata cheese, are known in the art. The most well-known type of pasta filata cheese is mozzarella. Further typical types include semi-skimmed mozzarella having a low moisture content, provolone, scamorza, kashkaval/kasheri, but also bocconcini, burrata, caciotta, caciocavall, for di latte, girellone, girellone farcito, palermitano, perette bianche, perette affumicate, perette filoncini, ragusano, scamorza, tenerella and trecce.

The various types of pasta filata cheese are distinguished by a special production step in which the cheese curd, after it has been separated into small portions, is melted or plasticized, drawn and kneaded. This working step, which is referred to as stretching, provides the cheese with a fibrous or a fiber-like structure which imparts a desired elasticity to the finished cheese.

In the traditional stretching method, the cheese curd is directly heated, by mixing with hot water at a temperature of 75° C.-95° C., said water also being referred to as stretching water, until the cheese has reached a temperature of approx. 55-65° C. and merged or plasticized to form a homogeneous mass. However, this leads to losses of yield since cheese ingredients are washed out by the stretching water. Up to 15% of fat and 5% of protein is lost in the process. The stretching water also has to be cleaned again. However, it is frequently not possible to clean the stretching water during the manufacturing process, and therefore waste water arises.

After the starting material has been loaded through the inlet opening, its state changes until the starting material leaves the chamber of the device via the outlet opening in a plasticized state in the form of cheese or an intermediate cheese product. Irrespective of the plasticizing state, the cheese material which is located in the chamber and is conveyed through the device is referred to as "cheese mass" within the context of this application.

Various alternative continuous methods for plasticizing acidified cheese curd, which methods managing without stretching water, are known. For example, EP 2 473 028 B1 (GEA/CMT Discovery) discloses a method, in which the cheese curd is heated with steam in a kneading chamber while being continuously transported by a pair of helical screws. This method reduces the product losses, and little to no stretching water arises.

EP 2 168 429 A1 (Bühler) discloses a method for producing dairy products, which method also managing entirely without stretching water. In this method, the mozzarella is indirectly heated from the outside as it is being transported in an extruder via two conveyor screws. Since the cheese mass is heated indirectly, such a device is also referred to as an indirect cooker.

Two indirect cookers are known from U.S. Pat. No. 8,221,816 B1 (Leffelman Ricky) and WO 2015/164391 A1 (Johnson Industries International, INC.). These two cookers comprise screw conveyors having two opposed conveyor screws, in which the cheese mass is heated indirectly both via a double jacket of the kneading chamber and via the screws which each have a hollow shank with a hollow liquid chamber. In addition, WO 2015/164391 A1 makes provision for the double jacket of the kneading chamber and the liquid chambers in the shanks or in the screw helices to be supplied with liquids of differing hotness and thus also to be heated differently.

Although the cited alternative stretching methods and stretching devices reduce waste water and result in a greater yield, they also have disadvantages in comparison to the traditional stretching devices and stretching methods. With long installation running times and high power settings (approx. 1000-8000 kg/h), these disadvantages manifest themselves in poorer cheese quality and/or a greater space requirement in comparison to traditional water stretching, if a similar final quality of the cheese is intended to be achieved.

SUMMARY OF THE INVENTION

It is one non-limiting object of the present teachings to disclose techniques for improving a device which belongs to the technical field mentioned at the beginning and which has the advantages of an indirect cooker, i.e. results in a smaller amount of product losses and less waste water, but makes it possible to achieve a similar final product quality to that of a traditional water stretching machine and also manages with a comparable space requirement. In addition, it is another non-limiting object of the present teachings to disclose techniques for improving a method which results in a smaller amount of product losses and generates less waste water than a traditional stretching method, but which makes possible a similar end product quality.

According to one non-limiting aspect of the present disclosure, two conveying shafts preferably include at least one entraining means configured in such a manner that the cheese curd which is to be conveyed and to be plasticized is at least partially also transported around the two conveying shafts during operation.

According to another non-limiting aspect of the present disclosure, a method for continuously conveying and plasticizing cheese curd, in particular for pasta filata cheese, preferably comprises:

a) loading a device having the above-noted conveying shafts with cheese curd, preferably in a form cut uniformly into pieces, as a starting material via an inlet opening, b) conveying the cheese curd which is to be plasticized along a conveying path between the inlet opening and an outlet opening of the device by driving the conveying shafts in opposite directions, preferably such that the cheese curd mass which is to be plasticized is stretched, preferably at a rotational speed of between 0.5 and 25 rpm, particularly preferably between 1-10 rpm, c) heating the inner circumferential surface of the chamber and the conveying shafts using a heating device such that the cheese curd at the outlet opening reaches a temperature of 50° C.-70° C., preferably 55° C.-65° C., with the cheese curd being continuously plasticized, wherein, in such a method, the cheese curd which is to be conveyed continuously is transported not only axially in the conveying direction, but also around the conveying shafts.

One advantageous effect of such a device and such a method is that the cheese curd which is to be conveyed at least partially rotates together with the conveying shafts, both in the starting form and in a form already partially plasticized, and is thus moved in (along) the channels respectively formed by each of the shanks of the conveying shafts, the helical turns of the helical structures and the inner circumferential surface of the chamber.

This has the effect that the cheese curd conveyed in the device or the cheese mass conveyed in the device temporarily flows along one of the walls of the inner circumference of the chamber, and the cheese curd or the cheese mass is thereby more thoroughly mixed without being subjected to a great structural destruction. This achieves a uniform distribution of temperature of the cheese curd or the cheese mass from the inside to the outside. That is to say, the cheese mass has only a small temperature difference between the shank of a conveying shaft and the inner circumference of the chamber. Great temperature differences in border zones of the cheese mass, i.e. in the region of the shanks of the pair of conveying shafts and in the region of the inner circumference of the conveying chamber, relative to the temperature in the core of the cheese mass can be avoided. In particular, temperature differences of ≥10° C. are unacceptable. One advantageous effect which can be achieved in at least some aspects of the present disclosure is that the entire cheese curd or the entire cheese mass can be heated to the temperature necessary for plasticizing within a short time.

In such aspects of the present disclosure, the cheese mass is prevented from being pushed in the axial direction from the inlet opening to the outlet opening only by the helical turns of the conveying shafts; i.e. the cheese mass is prevented from being pushed as a plug in the axial direction toward the outlet opening.

That is, the entraining means causes the cheese curd to be conveyed in the axial direction of the device not only by the helical turns of the helical structures, i.e. by the screw helices, but also to be rotated together with the conveying shafts, i.e. to be entrained tangentially to the circumferential direction with respect to the respective shank of the conveying shafts. More specifically, the cheese mass is not conveyed exclusively or for the most part in a region of the elongate chamber that lies spatially between the two planes that each pass through one of the axes of rotation of the conveying shafts and are simultaneously perpendicular to the perpendicular between the axes of rotation.

Overall, the quality of the cheese can be improved considerably by employing such a device and/or such a method.

The material which arises from milk curdled by the addition of rennet or lactic acid, after the milk has been broken up in order to separate off whey, is generally referred to as cheese curd. Depending on the type of cheese to be produced, the cheese curd is broken up into pieces of differently large or small size. The shreds can differ in size. For pasta filata cheese, the cheese curd is preferably in a diced form. Shreds of approximately fingertip size to finger size are particularly suitable. The cheese curd can also comprise thin shreds of palm size, for example shreds having a thickness of approx. 2-3 mm.

The device is preferably manufactured predominantly from stainless steel. For example, a stainless steel of the type AISI 304/1.4301 or AISI 316L/1.4404 (classified according to the American Iron and Steel Institute (AISI) system) is suitable. However, components made of different materials which are suitable in the field of food production can also be used. Materials of this type are known to a person skilled in the art. For example, plastics, such as polyethylene (PE) and/or polypropylene (PP), are suitable.

The shank of the conveying shaft is preferably in the form of a hollow shank, to the end of which in particular bearing journals are attached. The hollow shank has a significantly lower weight than a solid shank.

The entraining means are particularly preferably arranged on the conveying shafts only in the first half of the conveying path, in particular only in the first third or in the first quarter of the conveying path, since as soon as a strip of cheese mass has wound around the conveying shafts, the strip generally rotates further therewith.

The device preferably comprises a kneading chamber and/or a dry salter and/or a molder which can further process the cheese mass plasticized in the chamber. The molder provides the cheese with its final shape. The device also preferably comprises a shredder which can make shredded cheese curd available at the input of the inlet opening.

In a preferred embodiment of the present teachings, at least one helical turn of the helical structure has continuous blades.

Continuous blades can be produced in a particularly simple manner and can be cleaned in a simple manner. In addition, continuous blades have better mechanical stability. The blades can be produced, for example, from a flat steel or steel strip. However, production from individual blade segments arranged in a row one behind another is also possible. The blades or blade segments are preferably butt-connected to the corresponding conveying shaft, for example by welding thereon. In general, the conveying shafts can also be completely manufactured as a cast part.

An embodiment in which all of the helical turns of the helical structure are continuous is particularly preferred.

In a further preferred embodiment, at least one helical turn comprises interrupted (discontinuous, intermittent) and/or bent blades.

Interrupted blades make it possible to realize entraining means in a particularly simple manner. Blade edges of the interrupted blades, when appropriately configured, can enable cheese mass to rotate together with the conveying shafts, i.e. to be carried along tangentially to the circumferential direction with respect to the respective shank of the conveying shafts.

The interruption in an interrupted blade preferably extends radially from the outer end of the blade, i.e. the point which is furthest away from the corresponding axis of rotation of the conveying shaft, to the point at which the blade is fastened to the shank of the respective conveying shaft. However, it is also possible for the interruption not to be continuous. Helical turns having interrupted blades can be produced from individual blade segments. The interruption in the blades also makes it possible, for example, to save (reduce) weight. A blade preferably has a plurality of interruptions. The interruptions can be arranged equidistantly from one another. However, it is advantageous to distribute the interruptions along the conveying shaft in such a manner that, especially in the region of the inlet opening, a better carrying-along effect arises, for example because of a smaller distance between the interruptions in the region of the inlet opening.

According to one aspect of the present teachings, entraining means can be provided efficiently by employing bent blades. A bent blade of a helical turn is understood as meaning a blade in which a surface part of the blade is bent in relation to the remaining blade in such a manner that the bent surface part lies outside the fictitious (notional, virtual) screw contour in which the helical turn or the entire blade would otherwise lie. In such an embodiment, the blade can be bent in the circumferential direction or in the radial direction, or in both the circumferential direction and the radial direction. However, bending along a bending line running (extending) substantially radially with respect to the conveying shaft is particularly preferred.

An embodiment is particularly advantageous in which a helical turn is interrupted and, owing to the interruption or the interruptions, forms a plurality of interrupted blades, and the interrupted blades are simultaneously bent since, particularly in the region of the interruption, the blade can be bent in a particularly simple manner. A particular form of a bent blade is a blade which is bent in wavy form. A blade, the wave structures of which run (extend) in the circumferential direction, or the wave troughs and wave crests are oriented radially with respect to the conveying shaft, is preferred here.

Both an interrupted and a bent blade can be produced from individual segments. However, it is possible to cast said blades together with the shank of the conveying shaft. It is also possible to produce the blade from a flat steel or steel strip and to subsequently provide the interruptions and/or bends. Further depositing and/or removing manufacturing methods from the prior art can also be used.

The entraining means particularly preferably comprises a projection on the conveying shaft. A projection on the conveying shaft can be both a projection on a helical turn of the helical structure of the conveying shaft and/or a projection on the shank of the conveying shaft. A projection on the helical turn is a vertical elevation on one of the blade surfaces of a helical turn, wherein said elevation has to protrude from the blade surface by at least half a millimeter, preferably by more than 1 mm or more than 5 mm, and should extend at maximum over half the circumference of the shaft.

A projection on the shank is an elevation with respect to a substantially circular basic form (shape) of the shank of a conveying shaft, said elevation likewise rising from the circular basic shape by more than half a millimeter, preferably by more than 1 mm or more than 5 mm.

The elevation on the shank and therefore the projection can extend in the axial direction from one blade surface to a blade surface of the adjacent blade. Similarly, an elevation on the blade and therefore also the projection on a blade surface can extend from the shank to the outside diameter of the blade. Finally, however, a projection can also be formed by a rib- or web-shaped connection between the shank and the blade surface.

A projection is particularly well suited for entraining cheese mass since, when the conveying shaft rotates, cheese material or cheese mass remains stuck to the conveying shaft and is conveyed in the circumferential direction. However, it is also possible to produce an entraining effect by utilizing a depression in which cheese mass is entrenched and is then pulled along by the adjacent (following) cheese mass. Similarly, an entraining effect can be achieved by the surface composition or surface structure of the shank and/or the blade surfaces of a helical turn.

In a particularly preferred embodiment, the entraining means comprises a projection on the conveying shaft, said projection being formed by an element attached to the conveying shaft. An element attached to the conveying shaft is understood as meaning a separate element which is placed onto the conveying shaft. The element attached to the conveying shaft makes it possible to realize the projection in a particularly efficient manner. The realization of the projection by using an element attached to the conveying shaft also makes it possible to modify a conventional conveying shaft, even retrospectively. For example, an element can be welded, adhesively bonded, screwed, clamped or riveted to an existing conveying shaft. However, it is also possible to produce the element by depositing material, for example by casting or by depositing material layer by layer. The element can be composed of a different material than the conveying shaft, or than the part or the parts of the conveying shaft, to which the element is attached.

The element attached to the conveying shaft is preferably a flat element having at least one main surface. The at least one main surface is oriented here in such a manner that circumferential lines of the axis of rotation of the conveying shaft are substantially perpendicular to the main surface; in particular, the element attached to the conveying shaft is a plate.

By providing a large surface region directed in the circumferential direction, a particularly good entraining effect can be achieved. It has been shown that, for example, rectangular plates having a main surface of 40×25 mm are particularly suitable, with the longer side edge being intended to be directed preferably in the direction of the axes of rotation of the conveying elements. Rectangular plates can be produced particularly advantageously and can also be simply cleaned. However, use can also be made of other flat elements which, for example, have a non-rectangular base surface. In a further embodiment, the flat elements have an inwardly curved main surface directed in the direction of rotation, thus resulting in a shovel effect.

The element attached to the conveying shaft is preferably arranged on the helical structure and/or on the shank. An arrangement of the element on the helical structure can be produced particularly simply since the element can be arranged on a substantially level surface of the blade of a helical turn. In addition, the cleaning in such an arrangement is simple. By contrast, an arrangement on the shank is advantageous if the element has a long axial extent (dimension) since the element can then be fastened to the shank along a contour running in this direction and therefore good mechanical stability can be achieved. Particularly good mechanical stability is provided by arranging the element on both the helical structure and the shank.

It is particularly advantageous if the device has a projection which is formed by a blade edge of an interrupted blade and/or by a bent blade section of a bent blade. The blade edge can be designed in such a manner that it forms a projection with respect to the helical turn by the blade, for example, having a greater thickness at the edge and/or the blade being bent in the region of the blade edge. However, the projection in the blade can also be formed by a bent blade section which does not lie in the region of a blade edge. For example, a good entraining effect with simultaneously good mechanical stability can be achieved by forming a bend as a radial fold. Depending on the bending radius, the cleaning is also not made substantially more difficult.

In a particular embodiment, adjacent blades of a helical turn each have a bend in the form of a right-angled fold which runs (extends) radially with respect to the conveying shaft and via which the blades are connected to the adjacent blade.

It is particularly preferred that an inner circumferential surface of the elongate chamber comprises a first segment which is substantially concentric with respect to one of the two conveying shafts and a second segment which is concentric with respect to the other of the two conveying shafts. The radial distance of the circular-cylindrical shank section of the corresponding conveying shaft from the respective segment of the inner circumferential surface of the chamber is ≤70 mm, preferably ≤60 mm, ≤50, ≤40 mm or <30 mm.

The expression "a segment is concentric with respect to the conveying shaft" means that the segment is concentric with respect to the axis of rotation of the relevant conveying shaft. The segments are therefore also referred to below as concentric segments of the inner circumferential surface. The radial distance of the circular-cylindrical shank section of the relevant conveying shaft from the corresponding segment of the inner circumferential surface defines a channel thickness of a helical channel formed by the circular-cylindrical shank section, the corresponding segment of the inner circumferential surface and two adjacent helical turns. By contrast, the distance between two adjacent helical turns in the axial direction defines a channel width of the helical channel. The channel thickness limits the layer thickness of the cheese mass in the helical channel. By limiting the channel thickness and thus also the layer thickness of the cheese mass by specifying a maximum channel thickness or layer thickness, efficient heat transmission in the cheese mass is ensured by means of thermal conduction. At a maximum layer thickness of the cheese mass of 60-70 mm, it is possible, for example, to heat the cheese mass in the machine in such a manner that even the center of the cheese strand reaches a temperature of 60° C. during a residence period of 5-12 minutes, specifically without scorching of the product on walls of the helical channel occurring. At the same time, excessive shearing and mixing of the cheese mass can be avoided. This would impair the structure of the cheese masses.

It has been determined that there is the following approximate relationship between the overall volume of the helical channel or the cheese mass volume in the chamber, the maximum radial distance (i.e. the maximum channel thickness) and the minimum surface to be heated, which is composed of the inner circumferential surface of the chamber and the surface of the two shanks of the respective pairs of conveying shafts:

$$\text{minimum surface to be heated}[m^2] = \frac{\text{(cheese mass) volume of helical channel}[m^3] \times 2}{\text{maximum channel thickness}[m]}$$

The surface of the helical turns of the helical structure is not taken into consideration when determining the minimum surface to be heated.

The factor of two results from the fact that the cheese mass located in the channel is heated from two sides, namely from the inside by the two shanks and from the outside by the inner circumference of the chamber.

At a maximum channel thickness of 0.07 m, according to the formula of a ratio between the cheese volume present in the device or volume of the helical channel and the minimum surface to be heated, a factor of $2/0.07$ [1/m]=28.6 [1/m] arises. A ratio of ≥33, in particular ≥40, especially ≥50 or ≥60 [1/m] is preferred.

If the cheese volume in the chamber is, for example, 0.15 $m^3$, at a channel thickness of 50 mm the minimum surface should be 6 $m^2$ in total (0.15 $m^3$*2/(0.05 m)=0.15*40 $m^2$=6 $m^2$).

Furthermore, it is preferred that the housing comprises a cover which closes the chamber and forms part of the inner circumferential surface, wherein the cover preferably forms sections of the concentric segments of the inner circumferential surface, and said sections, which are formed by the cover, of the segments of the inner circumferential surface that are concentric with respect to the two conveying shafts are in contact with one another.

A cover facilitates the accessibility of the chamber for cleaning and also for maintenance measures.

Owing to the fact that the cover forms sections of the concentric segments of the inner circumferential surface, wherein said segments are in contact with one another, the inner circumferential surface can follow the contours of the envelopes of the conveying shafts that result from the rotation of the conveying shafts, and therefore there is only still a minimum gap between the envelopes of the conveying shafts and the inner circumferential surface. In addition, the average channel thickness is minimized. As a result, inter alia, the surface of the inner circumferential surface and the heating up of the cheese mass can be optimized. The concentric segments are preferably circular-cylindrical segments.

In a further preferred embodiment, the housing comprises a cover which closes the chamber and forms part of the inner circumferential surface, wherein the part of the inner circumferential surface that is formed by the cover is level. The level inner circumferential surface, which is formed by the cover, preferably tangentially adjoins the concentric segments of the inner circumferential surface of the chamber. As a result, an additional volume arises between the envelopes of the conveying shafts and the cover. This makes it possible for the cheese mass to be thoroughly mixed.

Similarly, an embodiment is preferred in which the housing comprises a cover which closes the chamber and forms part of the inner circumferential surface, wherein the cover forms sections of the concentric segments of the inner circumferential surface. These concentric segments tangentially adjoin the concentric segments which are not formed by the cover. In addition, the cover also forms a level surface of the inner circumferential surface, which level surface tangentially connects the sections, which are formed by the cover, of the concentric segments. The segments are preferably circular-cylindrical segments. In this embodiment, as in the case of a flat cover, an additional volume arises between the envelopes of the conveying shafts and the cover. This makes it possible for the cheese mass to be thoroughly mixed. In addition, the cover can be wider because of the circular-cylindrical sections since the cover follows the contour of the envelopes of the conveying shafts. The cover is preferably configured in such a manner that the sections of the concentric segments that are formed by the cover merge tangentially in the common plane, in which the two parallel axes of rotation lie, into the concentric segments of the inner circumferential surface that are not formed by the cover. The cover can thus cover the entire width of the conveying shafts. The greater cover width improves the accessibility of the chamber for maintenance, repair and cleaning work.

The segments of the inner circumferential surface that are concentric with respect to the respective conveying shafts are preferably connected to one another such that they completely surround the conveying shafts.

Since the segments of the inner circumference are concentric with respect to the circular-cylindrical shank sections, the inner circumferential surface can follow the contours of the envelopes of the conveying shafts. A small, substantially equidistant gap can thereby be realized between the envelopes of the conveying shafts and the inner circumferential surface of the chamber. A substantially constant channel thickness can also be achieved over the entire extent of the inner circumference. This makes it possible to optimize the surface of the inner circumference of the chamber that is available for heating the cheese mass, and the heating up of the cheese mass.

In a preferred embodiment of the present teachings, the elongate chamber is oriented substantially horizontally.

The substantially horizontal orientation refers to the correct (intended) use position of the device. The orientation of the chamber is defined here by the inclination of the axes of rotation with respect to the horizontal. In this aspect of the present teachings, a substantially horizontal orientation does not exclude a small inclination which, for example, makes it possible for a cleaning liquid to flow off so that the cleaning liquid does not remain in the machine. Such an inclination is typically 1-10 angular degrees, in particular 3-5 angular degrees.

However, it is also possible to operate the axis with an angle inclined with respect to the horizontal, for example with an angle, for example at 45°, in which the cheese mass is transported upward with respect to the horizontal.

However, a horizontal orientation is simpler to realize. In addition, the cheese mass does not have to be transported upward counter to gravity.

Furthermore, it is preferred that the helical structures of the two conveying shafts are configured in such a manner that when the conveying shafts have an opposite direction of rotation, in which the vertical tangential speed components of the conveying shafts between the axes of rotation are directed upward, the cheese curd is conveyed axially from the inlet opening to the outlet opening.

In the intended direction of rotation, the two conveying shafts consequently move outward, as viewed from above. This means that cheese curd loaded from above is first of all transported outward by the entraining means of the conveying shafts and around the conveying shafts. The cheese mass is thereby immediately distributed in the chamber and does not remain stuck between the conveying shafts. The cheese mass is thus distributed very well between the inner circumference and the shanks of the conveying shafts. The available surface of the inner circumference and the surface of the shanks can thus be optimally used for heating the cheese mass.

An arrangement of the inlet opening on the upper side of the chamber is particularly preferred since it not only permits simple loading with cheese curd but particularly makes it possible to profit from the advantages described above. However, axial loading or lateral loading is in principle also possible.

In a further preferred embodiment, the shank comprises a tapered section which is directed toward the inlet opening. Said section is preferably at maximum one third of the length of an axial conveying path, particularly preferably at maximum one quarter of the length of the axial conveying path.

The length L of the conveying path is the axial distance between the inlet opening and the outlet opening. The shank diameter which is smaller in the region of the inlet opening makes it possible to more uniformly load the chamber with cheese curd. The tapered section is particularly preferably tapered continuously. In particular, the tapered section comprises one or more conical subsections and/or one or more circular-cylindrical subsections. The subsections are preferably arranged in such a manner that the tapering of the tapered section runs continuously toward the inlet opening, i.e. not in a stepped manner.

The continuous profile facilitates the axial transport of the cheese mass. Alternatively or additionally to conical sections, subsections having other circular-symmetrical forms (shapes), the diameter of which tapers along the axis of symmetry thereof, are conceivable. However, a conical shank section can be produced in a simple manner, just as a circular-cylindrical shank section.

Furthermore, a device is preferred in which the helical turns have sections of differing pitch. The pitch of the helical turns particularly preferably varies at least in the first quarter of the conveying path, in particular at least in the first third or in the first half of the conveying path.

In a preferred embodiment, the pitch of the helical turns decreases in the direction of the conveying path, i.e. the axial distances between adjacent blades of the helices become smaller in the direction of the output opening.

The effect achieved by the greater pitch in the region of the inlet opening is that the cheese mass is more uniformly thoroughly mixed in the region of the inlet opening. The decrease in the pitch at the beginning of the conveying path also has the effect that the cheese curd or the cheese mass is compressed at the beginning of the conveying path and air is squeezed out of the cheese mass.

In an alternative embodiment, the pitch of the helical turns increases in the direction of the conveying path, i.e. the axial distances between adjacent blades of the helices become greater in the direction of the output opening. A small pitch in the region of the input opening permits the cheese curd or the cheese mass to be more rapidly transported away in the region of the inlet opening. It also makes it possible to build up the pressure on the cheese mass from the beginning and thus to initiate the compression from the beginning.

In a further preferred embodiment of the invention, the pitch of the helical turns is substantially constant over the entire conveying path.

Furthermore, it is preferred that the pitch of the helical turns decreases at the beginning of the conveying path and increases again at the end of the conveying path. A pitch increasing toward the end of the conveying path has the effect that the cheese mass can relax in the direction of the conveying path toward the outlet opening.

Owing to the fact that the pressure required for compressing the cheese mass is already built up at the beginning, gentle transport of the cheese mass is made possible.

The device is preferably configured in such a manner that the ratio L/D between the length L of the axial conveying path and an outside diameter D of the conveying shafts is approximately 1-20 (1:1 to 20:1), preferably 2-15 (2:1 to 15:1), in particular 4-12 (4:1 to 12:1) or 4-8 (4:1 to 8:1).

In comparison to the prior art, devices according to the present teachings can be produced with a small L/D ratio and which manage (operate) without waste water and losses of cheese components and nevertheless produce good cheese quality. As a result, such devices have for example an effective length which is comparable to traditional stretching machines, but are shorter than devices for continuously conveying and plasticizing cheese curd according to the prior art, which devices indirectly heat the cheese mass.

The conveying shafts, in particular the shanks of the conveying shafts, and the housing preferably comprise fluid channels for controlling the temperature of the chamber, wherein the fluid channels are part of the heating device and extend substantially along the entire axial conveying path.

The fluid channel of the housing can be realized, for example, by a double jacket which surrounds the inner circumference of the chamber. The configuration of double jackets for controlling the temperature, i.e. for heating and also for cooling, is known to persons skilled in the art. A known embodiment of a double jacket provides channels encircling in a spiral shape. A double jacket can also be realized by "pillow plates". Such products are commercially available, inter alia, under the brand name Trapcold®. A double jacket permits very good recovery of heat.

The fluid channels for heating or controlling the temperature of the conveying shaft are preferably realized in the shank. Additionally or alternatively thereto, it is also possible to integrate the fluid channels in the helical structure. The fluid channels of the conveying shafts preferably in each case comprise an outer double jacket on the outside diameter of the shank. The fluid for the fluid channel or the double jacket of the conveying shaft is advantageously supplied axially from the side on which the inlet opening is located.

The interior of the shanks preferably in each case comprises a return channel which communicates with the fluid channel, for example with the double jacket, and returns the fluid to the same side via which the fluid channel of the conveying shaft is supplied with fluid, i.e. preferably the side directed toward the inlet opening.

The shank is preferably hollow on the inside and filled with air. In addition to reducing weight, this also permits simple passage of the return channel in the interior of the shank. Space can be saved by returning the fluid in the shank.

A smaller fluid volume in the fluid channel of the housing and/or in the fluid channel of the conveying shaft also causes a higher flow rate of the fluid or of the heating fluid and a better transfer of heat between the heating fluid and the respective wall of the channel.

In particular, this configuration permits more freedom in the arrangement of the outlet opening since the fluid supply to the conveying shaft or to the shank can be realized exclusively via the side of the inlet opening. For the same reason, the drive means, in particular the electric motor, is also arranged on this side.

The heating device preferably comprises a dedicated heating element. Instead of a dedicated heating element, the device can also manage (operate) without a heating element by supplying heated fluid from an external source.

The fluid for the heating device is preferably water.

However, the function of the device is not tied to a heating device which provides the heat via a fluid circuit. The inner circumference and the conveying shafts can also be heated via other known heat sources, such as, for example, via electric or electromagnetic heat sources.

Furthermore, it is advantageous that the heating device is configured in such a manner that the temperature difference between the supplied fluid and the discharged fluid differs by less than 10° C., preferably less than 5°, particularly less than 2° C. or less than 1° C., and/or the fluid temperature in the advance flow is smaller (lower) than 90° C., particularly preferably between 75 and 85°.

A small temperature difference between advance flow and return flow and thus in the fluid channel permits uniform heating. In addition, locally high fluid temperatures are avoided. Scorching of product on a wall, for example on the inner circumference, on the shank and/or on the helical structure, is avoided by utilizing advance flow temperatures of less than 90° C., preferably between 75° C. and 85° C.

The fluid channels of the shanks and of the housing are preferably connected to a common reservoir, wherein the advance flow temperature is likewise identical in each case. The configuration of the device is thereby simplified.

Methods according to the present teachings are preferably also designed in such a manner that the ratio between the sum of the heated surfaces of the shanks of the conveying shafts and the surface of the inner circumference to the volume of the cheese curd located in the chamber is >33[l/m], particularly preferably >40, in particular >50 or >60 [l/m].

The cheese curd, which serves as the starting material, is preferably provided at a temperature of between 10° C. and 45° C.

In addition, the method is preferably carried out on (in) an installation in which the heating device is a fluid heating device. The fluid is preferably controlled here to an advance flow temperature of 75-90° C., particularly preferably to 75-85° C.

The conveying speed or the rotational speed is preferably selected in such a manner that the cheese mass remains between 2 and 20 min, preferably between 5 and 12 min, in the chamber of the device.

The cheese curd provided is in particular acidified cheese curd, preferably cut into uniform pieces.

The shreds or pieces of the cheese curd are preferably fingertip size, finger size or else palm size having a thickness of approx. 2-3 mm.

Further advantageous embodiments and combinations of features of the invention emerge from the detailed description below and from the entirety of the patent claims.

BRIEF DESCRIPTION OF THE DRAWINGS

In the drawings used for explaining the exemplary embodiment:

FIG. 2a shows a schematic top view of the pair of conveying shafts of the first exemplary embodiment shown in FIG. 1;

FIG. 2b shows a schematic side view of the pair of conveying shafts of the first exemplary embodiment shown in FIG. 1;

FIG. 2c shows a schematic front view of the pair of conveying shafts of the first exemplary embodiment shown in FIG. 1;

FIG. 2d shows the axial section AB in FIG. 1, in greatly simplified form;

In principle, identical parts are provided with the same reference signs in the figures of an identical exemplary embodiment. Corresponding parts in a different embodiment are differentiated in their hundreds position. They are in each case increased by 1 for each additional embodiment. Parts which are assigned to the first conveying shaft of the pair of conveying shafts are identified by the addition of "0.1". Parts which are assigned to the second conveying shaft of the pair of conveying shafts are identified by the addition of "0.2".

DETAILED DESCRIPTION OF THE INVENTION

Figure 1:
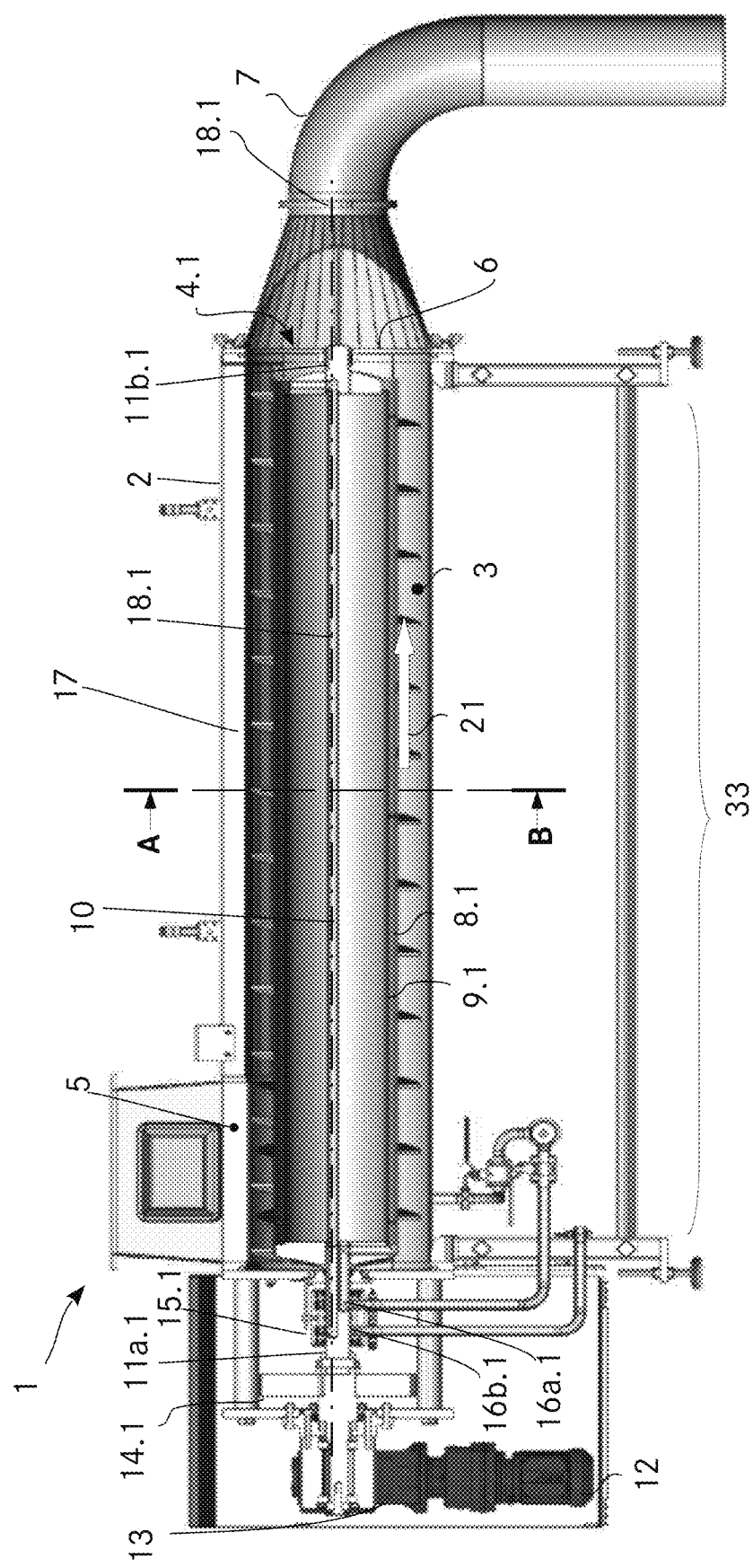
FIG. 1 shows a schematic vertical section through a first exemplary embodiment of the device according to the present teachings.

FIG. 1 shows a schematic vertical section of a first exemplary embodiment of a representative device 1 according to the present teachings for continuously conveying and plasticizing cheese curd or cagliata. This device 1 is suitable in particular for producing mozzarella. The device 1 comprises a housing 2 that defines an inner elongate chamber 3 in which a pair of conveying shafts driven in opposite directions is arranged, wherein the pair of conveying shafts comprises a first conveying shaft 4.1 and a second conveying shaft 4.2. Only the first conveying shaft 4.1 is visible, in vertical section, in FIG. 1, since the second conveying shaft 4.2 is mostly concealed by the first conveying shaft 4.1. The illustration of the conveying shaft 4.1 in FIG. 1 is also simplified to the extent that it does not show the entraining means of the conveying shaft. However, the conveying shafts 4.1 and 4.2 of the first exemplary embodiment are illustrated separately with the entraining means in FIGS. 2a-2c. The conveying shafts 4.1 and 4.2 are both mounted rotatably in the housing 3, wherein their axes of rotation 18.1, 18.2 (FIG. 2a) are arranged parallel to one another.

At one end on the upper side, the housing 2 comprises an inlet opening 5 through which shredded cheese curd can be supplied from above. At the other end of the housing 2 there is an axial outlet opening 6, through which the cheese curd which was conveyed by means of the conveying shafts 4.1 and 4.2 and was plasticized on the conveying path 33 between inlet opening 5 and outlet opening 6 can be discharged from the elongate chamber 3 of the device 1 via a tubular channel (conduit) 7. The conveying direction of the device 1 is illustrated (depicted) by arrow 21. It runs (extends) parallel to the axes of rotation 18.1, 18.2 from the inlet opening 5 in the direction of (toward) the outlet opening 6.

During operation as intended, the axes of rotation are oriented substantially horizontally to the positioning plane, i.e. they are at only a slight inclination of approximately 3° toward the outlet opening 6. This permits the drainage of water, for example during cleaning of the chamber. However, this inclination cannot be seen in the schematic illustration.

The conveying shafts 4.1 and 4.2 are constructed very similarly, and therefore common features are described only with reference to the first conveying shaft 4.1. The two conveying shafts each comprise a substantially circular-cylindrical hollow shank 8.1 which has a double jacket 9.1 on the outside diameter. The double jacket 9.1 serves as a water channel for controlling the temperature of or heating the inner circumference of the chamber 3 or the cheese mass located therein. At each of its two ends, the hollow shank 8.1 has a bearing journal, specifically a front bearing journal 11a.1 on the side of the inlet opening 5 and a rear bearing journal 11b.1 on the side of the axial outlet opening 6.

On the side of the inlet opening 5, in the extension of the front bearing journal 11a.1 there is an electric motor 12 having an angular gear 13. the output shaft of the angular gear 13 is connected via a compensating coupling to the front bearing journal 11a.1 and can therefore drive the first conveying shaft 4.1. The second conveying shaft 4.2 is driven via a pair of gearwheels, of which the first gearwheel 14.1 sits on the output shaft of the angular gear 13 and, via a second gearwheel (not illustrated as it is concealed), which is paired with the first gearwheel 14.1, drives the second conveying shaft 4.2 in the opposite direction.

The double jacket 9.1 of the conveying shaft 4.1 is supplied with hot water via a rotary leadthrough (duct). The rotary leadthrough comprises a fixed cylinder 15.1 and two radial intersections in the bearing journal 11a.1 of the conveying shaft. The first radial intersection 16a.1 of the rotary leadthrough serves to supply heating water to the double jacket 9.1 and the second radial intersection 16.1b serves to return the heating water from the double jacket 9.1. The direction of flow of the water in the double jacket 9.1 is the same as the conveying direction of the cheese mass, namely axially in the direction of (toward) the output opening 6. In the center of the hollow shank 8.1 there is a return channel 10 which communicates with the double jacket 9.1 and which returns the water via the rotary leadthrough into a water reservoir (not illustrated) where the cooled water is heated up again.

The housing 2 likewise comprises a double jacket or a hot water jacket 17 which surrounds the inner circumferential surface of the chamber 3, in order to control the temperature of or heat the chamber 3 and the cheese mass located therein. This jacket 17 is preferably supplied with water by (from) the same water reservoir as the conveying shaft. The chamber 3 is thus heated both via the double jackets (only double jacket 9.1 is visible) of the hollow shanks 8.1 and 8.2 of the two conveying shafts 4.1 and 4.2 and also via the hot water jacket 17 of the housing.

FIGS. 2a-c show schematically and in highly simplified form the conveying shafts 4.1 and 4.2 of the first exemplary embodiment in various views. FIG. 2a shows a top view of the conveying shafts 4.1 and 4.2, FIG. 2b shows a side view, in which only the first conveying shaft 4.1 is visible, and FIG. 2c shows a front view of the conveying shafts 4.1 and 4.2. The conveying shafts 4.1 and 4.2 each have a cylindrical hollow shank 8.1, 8.2 on which a single-start helical structure in the form of a continuous helix 19.1, 19.2 is in each case attached or welded, i.e. the helices of the present exemplary embodiment each comprise a single continuous blade.

The first conveying shaft 4.1 is designed for right-rotating operation and therefore has a left-rotating helix 19.1. By contrast, the second conveying shaft 4.2 is designed for left-rotating operation and therefore has a right-rotating helix 19.2. In the fitted state, the helices 19.1 and 19.2 engage (interleave) in one another. FIG. 2*c* illustrates the correct direction of rotation of the shafts, which brings about the transport of the cheese mass from the inlet opening 5 to the outlet opening 6. The conveying shafts rotate here in a direction which causes cheese curd which has been poured in from above to first of all be transported outward.

The two conveying shafts 4.1, 4.2 have helices with a total of 13½ revolutions, which corresponds to a pitch of 150 mm. However, helices with a different number of revolutions can also be used, for example helices with 11½ revolutions and a pitch of 190 mm. On the first 9 revolutions with respect to the conveying direction, three small metal plates 20.1, 20.2 per revolution are welded axially onto the respective helices 19.1, 19.2. The small metal plates 20.1, 20.2 constitute projections on the respective conveying shaft 4.1, 4.2 and serve here as entraining means. The small metal plates on one helical revolution are in each case offset from one another by 120° such that they form three rows offset by 120° on each conveying shaft 4.1, 4.2. The small metal plates 20.1, 20.2 are in each case identical in size and have a main surface that is 40×25 mm, wherein the longer side of 40 mm is directed in the axial direction. The narrower side of 25 mm is oriented on the helix 19.1, 19.2 radially with respect to the shank 8.1 such that it is approximately flush with the outer diameter of the helices 19.1, 19.2. The thickness of the small plates is approximately 5 mm and is selected in such a manner that the small plates are sufficiently stable and can be fastened well to the helix 19.1, 19.2. Overall, each conveying shaft 4.1, 4.2 comprises 9×3=27 small metal plates. The small metal plates 20.1 of the first conveying shaft 4.1 are welded on the side of the left-rotating helix 19.1 that points in the direction of (toward) the inlet opening 5. By contrast, small metal plates 20.2 of the second conveying shaft 4.2 are welded on the side of the right-rotating helix 20.2 that points toward the outlet opening 6.

In this arrangement, it is especially advantageous that the small metal plates 20.1 and 20.2 are arranged on opposite sides of the respective helices.

FIG. 2*d* illustrates the section AB in FIG. 1. It shows in particular the contour of the housing 2 of the device 1. The housing 2 has a conveying vat 39 and a cover 40 which together form the inner circumference of the elongate chamber 3 defined by the housing 2. The cover 40 upwardly closes the chamber 3, in which the conveying shafts 4.1 and 4.2 are rotatably mounted. The housing 2 having the conveying vat 39 and the cover 40 has the overall shape of a perpendicular hollow cylinder. The part of the inner circumferential surface of the hollow cylinder that is formed by the conveying vat 39 follows the outer circumference of the conveying shafts 4.1 and 4.2 or the envelopes of the conveying shafts 4.1 and 4.2, said envelopes being formed during rotation of the conveying shafts 4.1 and 4.2. Accordingly, the inner circumference 22 of the chamber 3 runs (extends) in the corresponding sections in each case concentrically with respect to the adjacent conveying shaft 4.1 or 4.2. Said inner circumference forms a first concentric segment 41.1, which is concentric with respect to the first conveying shaft 4.1, and a second concentric element 41.2, which is concentric with respect to the second conveying shaft 4.2. The concentric segments 41.1 and 41.2 are circular-cylindrical and have a common contact line which lies centrally below the axes of rotation 18.1 and 18.2 and runs (extends) parallel thereto. The cover 40 has a flat underside. The transitions between the concentric segments 41.1 and 41.2 and the flat underside of the cover 40 are continuous and virtually tangential. A clearance 42, which is good for the thorough mixing of the cheese curd, is provided between the conveying shafts 4.1, 4.2 and the cover 40.

Figure 2E:
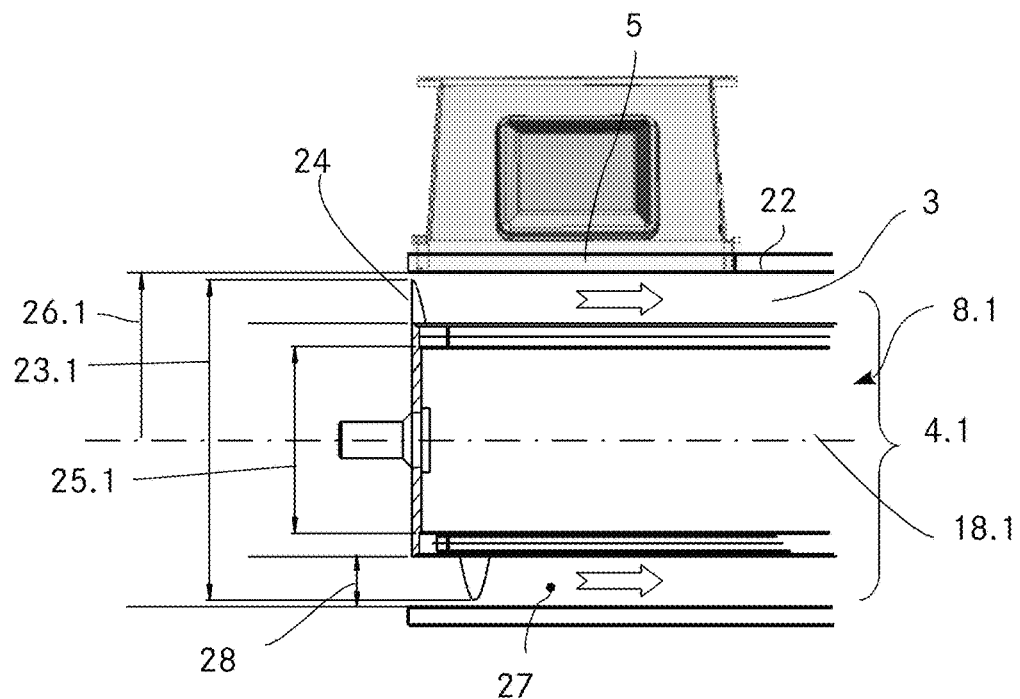
FIG. 2e shows a detail of the vertical section shown in FIG. 1, in greatly simplified form.

FIG. 2*e* illustrates the front part of the device, which is directed toward the inlet opening, according to the first exemplary embodiment in highly simplified form in side view in order to illustrate the size ratios between chamber 3 and conveying shafts 4.1 and 4.2. The inner circumference 22 of the chamber 3 runs (extends) substantially concentrically in each case with respect to the envelope of the two conveying shafts or in each case with respect to the circular-cylindrical hollow shanks 8.1 and 8.2. The dimensions of the conveying shafts are illustrated here with reference to the first conveying shaft 4.1 since the second conveying shaft 4.2 has substantially the same dimensions. The outside diameter of the first conveying shaft 23.1 corresponds to the outside diameter of the helix, of which an outline of the first revolution is illustrated in FIG. 2*e*. It is 350 mm. The outside diameter of the hollow shank 25.1 is 254 mm. The concentric segments of the inner circumference have a radius 26.1 of 180 mm, which corresponds to a diameter of 360 mm. This is therefore only slightly larger than the outside diameter of the conveying shaft 23.1 of 350 mm. A conveying channel 27 for conveying the cheese mass, said conveying channel having approximately a channel thickness 28 of 53 mm, is thus formed between the hollow shanks 8.1 and 8.2 and the circular segments of the inner circumference.

Figure 3:
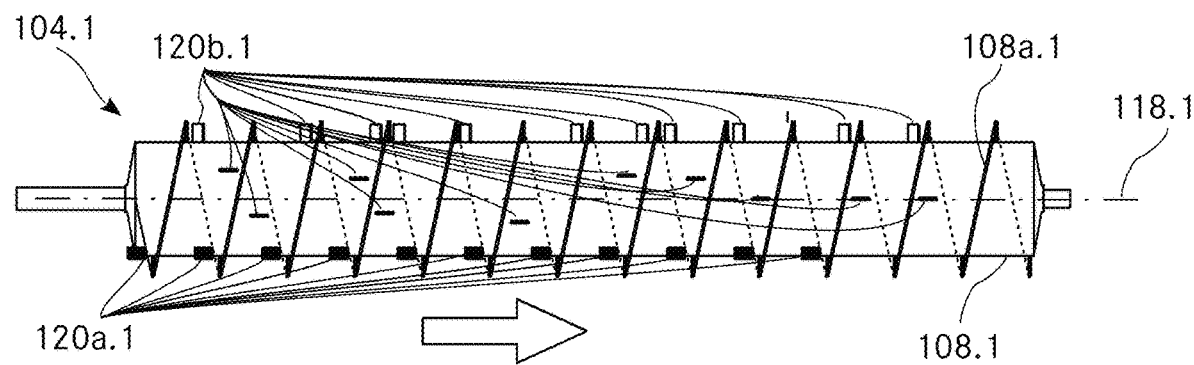
FIG. 3 shows a schematic side view of a conveying shaft of a second exemplary embodiment of the present teachings.

FIG. 3 is a schematic side view of the first conveying shaft 104.1 of a second exemplary embodiment of the present teachings. This conveying shaft 104.1 is substantially identical to the first conveying shaft 4.1 of the first exemplary embodiment. In contrast to the conveying shaft 4.1 of the first exemplary embodiment, the small metal plates 120*a*.1 and 120*b*.1 in this exemplary embodiment are not only welded axially to the helix 119.1 but also radially to the cylindrical hollow shank 108.1. Per helix revolution, one small metal plate 120*a*.1 is in each case welded per helix revolution axially to the helix, specifically on the side from which the cheese mass is supplied. In addition, small metal plates 120*b*.1 are also welded radially to the hollow shank 108.1 of the conveying shaft 104.1. Small metal plates having a main surface of 40×25 mm are used in each case here. In the case of the radially arranged small metal plates 120*b*.1, the longer side of 40 mm points in the radial direction while the shorter side of 25 mm points in the axial direction. In the case of the axially arranged small metal plates 120*a*.1, the longer side of 40 mm points in the axial direction while the shorter side of 25 mm points in the radial direction, i.e. in the direction of the axis of rotation 118.1.

In this second exemplary embodiment, the radially arranged small metal plates 120*b*.1 are not distributed uniformly over the circumference, but rather at irregular distances. However, it is also possible to distribute the small metal plates uniformly over the circumference. The axially arranged small metal plates 120*a*.1 are arranged regularly so that they are arranged in a row along the conveying shaft.

Figure 4:
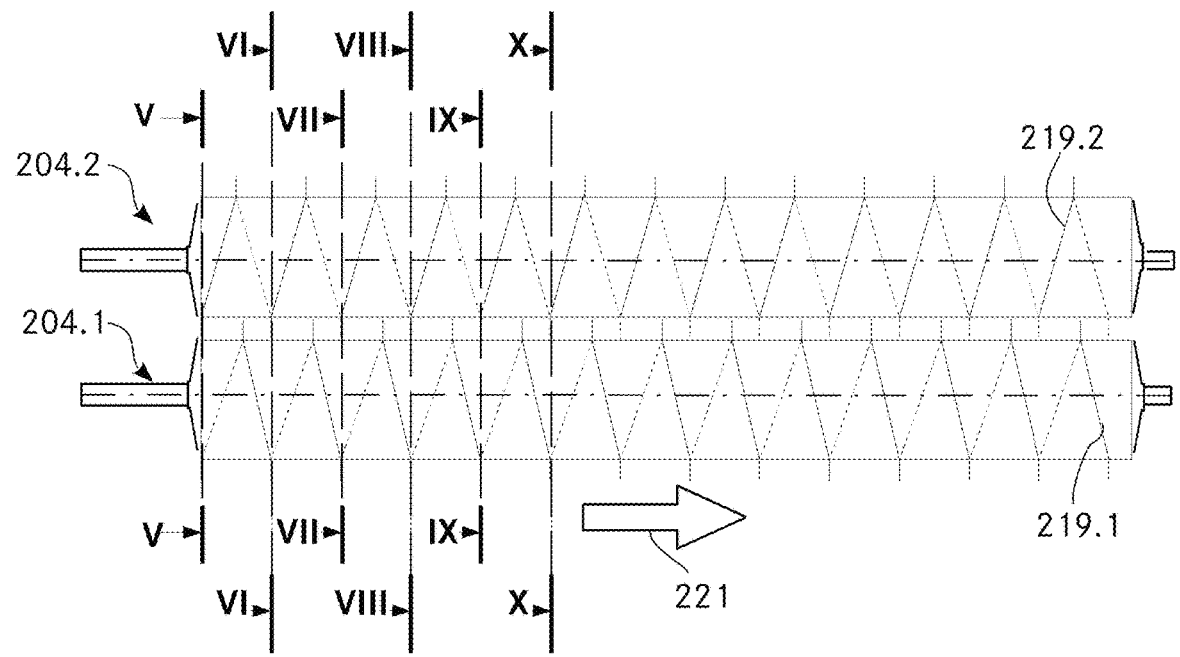
FIG. 4 shows a schematic top view of a pair of conveying shafts of a third exemplary embodiment of the present teachings.
Figures 5, 6, 7, 8, 9, 10:
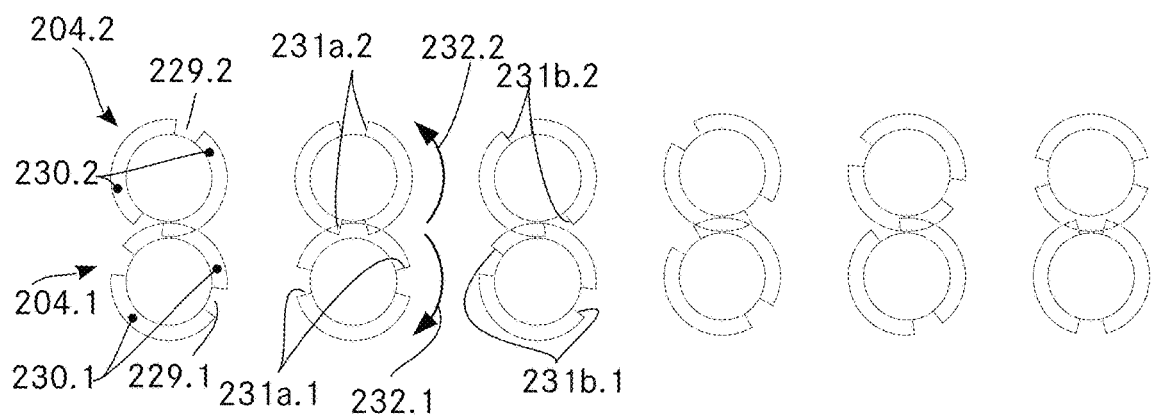
FIGS. 5-10 show schematic cross sections of the pair of conveying shafts of the third exemplary embodiment of the present teachings.

FIG. 4 shows a schematic top view of a pair of conveying shafts of a third exemplary embodiment of the present teachings. The pair of conveying shafts comprises a first conveying shaft 204.1 and a second conveying shaft 204.2.

The blades of the helical structures of the first conveying shaft 204.1 and of the second conveying shaft 204.2 are in each case interrupted radially such that the helical structures have approximately two blades per revolution. The six equidistant cross sections V-X (Roman numerals) shown in FIG. 4 are illustrated in FIGS. 5-10. The sections have been realized at an axial distance which corresponds in each case to one revolution of the helices 219.1 and 219.2 of the first and second conveying shafts 4.1 and 4.2.

FIGS. 5-10 show the interruptions 229.1, 229.2 in the blades of the first and of the second conveying shaft. The interruptions respectively divide the helices of the two conveying shafts 219.1 and 219.2 into two blades 230.1 and 230.2 per helix revolution. For reasons of clarity, the reference signs for identical parts are not repeated for each figure, but rather are introduced in each case only once for all of FIGS. 5-10. The interruptions between two consecutive sections are offset by approximately 20 degrees in the section. The angular position of the interruptions 229.1 of the first conveying shaft 204.1 is displaced in the clockwise direction with the axial position in the conveying direction. In a corresponding manner, the angular position of the interruptions 229.2 of the second conveying shaft 204.2 is displaced in the counterclockwise direction with the axial position in the conveying direction.

The interruptions 229.1 and 229.2 have the effect that, during rotation of the conveying shafts, the cheese mass at least partially rotates therewith. The interruptions therefore serve as entraining means. The axially conveyed cheese mass flows not only along the helix, but also through the interruptions 229.1 and 229.2 which then entrain the cheese mass in the direction of rotation of the conveying shafts. In particular the edges 231*a*.1 and 231*a*.2 (of the blades 230.1 and 230.2) that point in the direction of rotation assist the entraining of the cheese mass. The correct direction of rotation is indicated by the arrows 232.1 and 232.2. In addition, the edges 231*a*.1, 231*a*.2 pointing in the direction of rotation and the edges 231*b*.1, 231*b*.2 not pointing in the direction of rotation can be configured in such a manner that they further improve the entraining of the cheese mass by having, for example, axially protruding elements.

Figure 11:
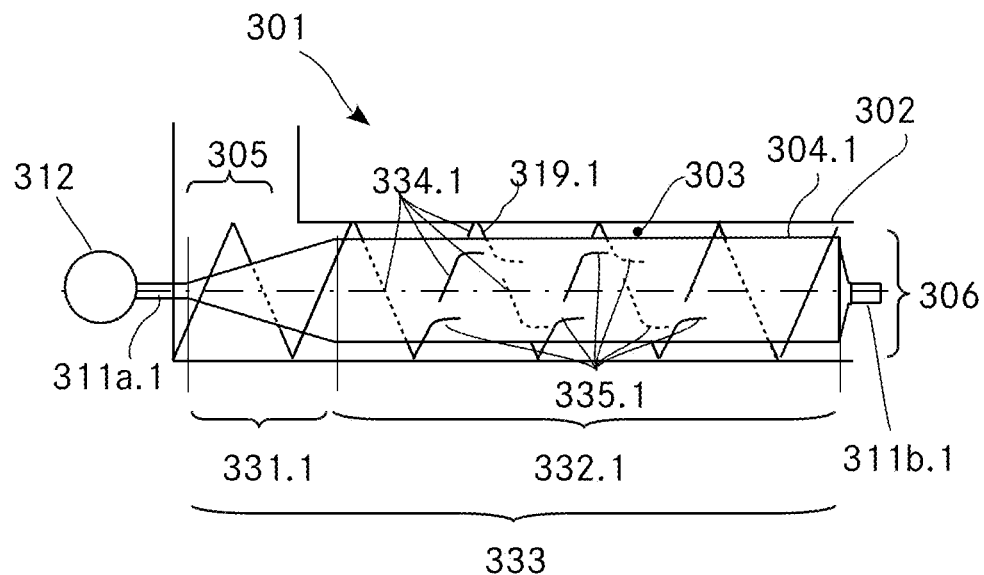
FIG. 11 shows a schematic and greatly simplified illustration of the device according to a fourth exemplary embodiment of the present teachings.

FIG. 11 shows a fourth exemplary embodiment of the device 301 in a schematic and highly simplified side view. The housing 302 of the device 301 comprises an inlet opening 305 and an outlet opening 306. In the elongate chamber 303 of the housing 302 there is a first conveying shaft 304.1 and a second conveying shaft, but which is not visible in the figure. The two conveying shafts are mounted to be rotatable via two bearing journals. The first conveying shaft 304.1 is driven by an electric motor 312. The second conveying shaft, not visible, is coupled to the electric motor via a gear, not illustrated, in such a manner that it rotates in the opposite direction to the first conveying shaft. Only the first conveying shaft 304.1 is described below since the second conveying shaft is substantially identical and differs substantially only with respect to the direction of revolution of the helix. The first conveying shaft 304.1 comprises, between the front and rear bearing journals 311*a*.1 and 311*b*.1, a shank which is divided into a conical shank section 331.1 and a circular-cylindrical shank section 332.1. The conical shank section 331.1 is tapered toward the inlet region or toward the front bearing journal 311*a*.1 and merges in the direction of the outlet opening 306 into the circular-cylindrical shank section 332.1. A helix 319.1 is arranged on the circumference of the shank. The envelope of this helix, which arises (is traced) when the helix rotates, is substantially circular-cylindrical. In this fourth exemplary embodiment, the length of the conical shank section 331.1 is approximately ¼ of the axial conveying path 333 which is the axial distance between the frontmost point of the inlet opening 305 and the center point of the outlet opening 306. The smaller shank diameter in the region of the inlet opening permits a more uniform loading of the chamber with cheese curd.

In the region of the circular-cylindrical shank section 332.1, the helix 319.1 is interrupted and has a plurality of bent blades 334.1. The bent blades 334.1 have blade sections 335.1 bent axially in the direction of the outlet opening 306. The blade side edge which is the trailing edge in the correct direction of rotation is bent here. The bent blade section in each case forms a projection which entrains cheese mass in the direction of rotation and causes cheese mass to be transported around the conveying shaft 304.1.

Figure 12:
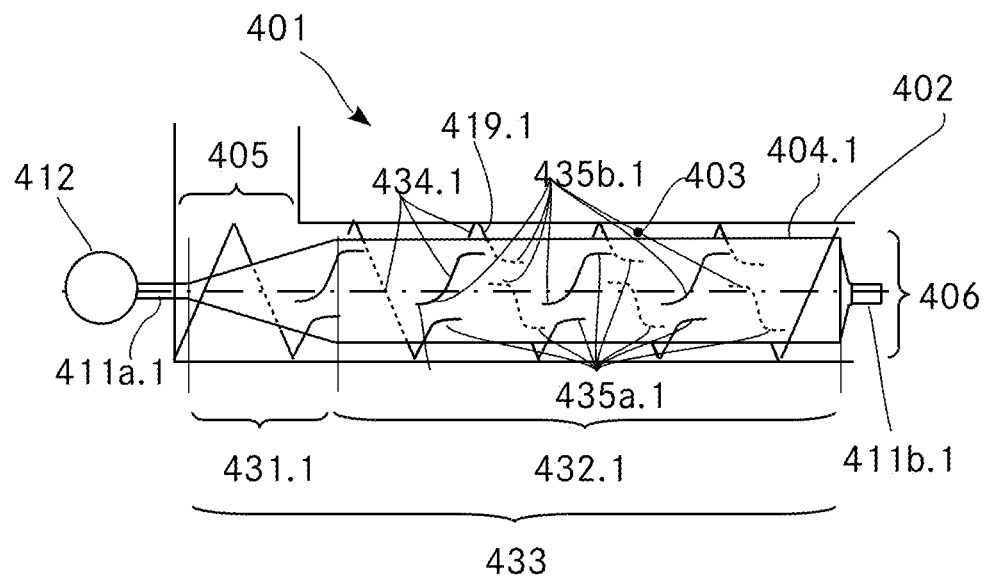
FIG. 12 shows a schematic and greatly simplified illustration of the device according to a fifth exemplary embodiment of the present teachings.

FIG. 12 shows a fifth exemplary embodiment of the device 401 in a schematic and highly simplified side view. This exemplary embodiment is very similar to the fourth exemplary embodiment and differs therefrom only by the configuration of the helices of the conveying shafts, which are mounted to be rotatable in the elongate chamber of the housing 402.

Corresponding components of the fifth exemplary embodiment bear the reference signs of the fourth exemplary embodiment increased by the number one hundred.

The shank form (shape) of the pair of conveying shafts of this exemplary embodiment, of which in turn only the first conveying shaft 404.1 is visible in FIG. 12, is the same as the shank form (shape) of the fourth exemplary embodiment, i.e. the shank of the conveying shaft comprises a conical shank section 431.1 and a circular-cylindrical shank section 432.1. The conical shank section 431.1 is tapered toward the inlet region or toward the front bearing journal 411*a*.1 and merges in the direction of the output opening 406 directly, i.e. without step, into the circular-cylindrical shank section 4321.1.

The form (shape) of the helices of this exemplary embodiment will now be described with reference to the first conveying shaft 404.1 illustrated in FIG. 12. From the second helix convolution, the helix 419.1 has interruptions and is divided into a plurality of blades 434.1. In contrast to the preceding exemplary embodiment, the blades 434.1 not only have blade sections 435*a*.1 which are bent axially in the direction of the outlet opening 406, but also blade sections 435*b*.1 which are bent axially in the direction of the inlet opening 405. The blade sections 435*a*.1 which are bent in the direction of the outlet opening 406 are in each case bent, as in the third exemplary embodiment, on the blade side edge which is the trailing edge in the correct direction of rotation. By contrast, the blade sections 435*b*.1 which are bent in the direction of the inlet opening 405 are in each case bent on the leading side edge of the corresponding blade in the correct direction of rotation.

Both the blade sections 435*b*.1 bent toward the inlet opening 405 and the blade sections bent toward the outlet opening 435*a*.1 in each case form projections which entrain cheese mass in the direction of rotation, and thus make it possible for the cheese mass in the chamber 403 to be transported (circumferentially) around the conveying shaft 404.1 such that the cheese mass is not transported only axially in the conveying direction 433.

Figure 13:
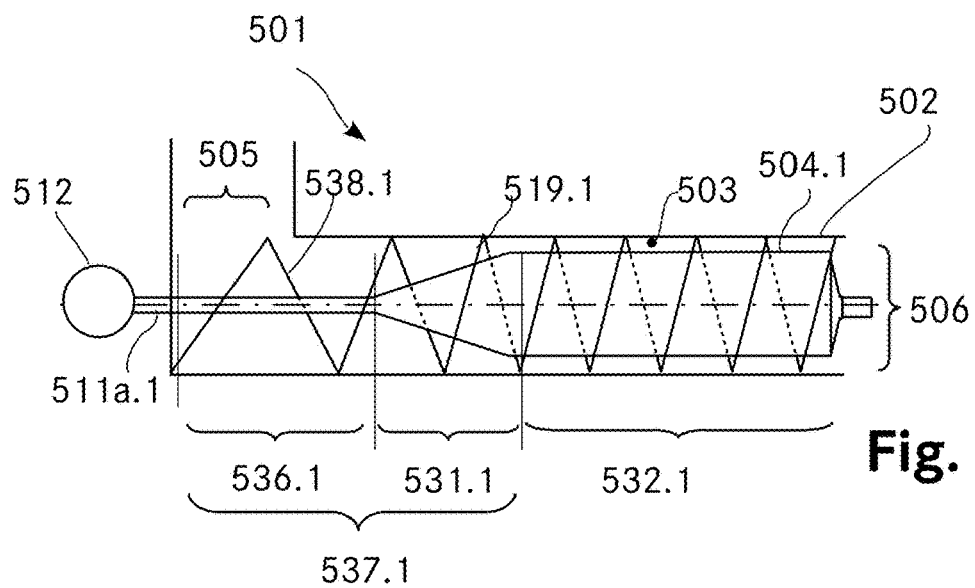
FIG. 13 shows a schematic side view of the device according to a sixth exemplary embodiment of the present teachings.

FIG. 13 shows a device 501 according to a sixth exemplary embodiment of the present teachings. It differs from the devices 301 and 401 according to the fourth and fifth exemplary embodiments in turn only by the configuration of the pair of conveying shafts. Corresponding parts have reference signs which are increased by the number two hundred in comparison to the third exemplary embodiment.

Again only the first conveying shaft 504.1 is described since the second is configured substantially identical to the first conveying shaft and differs from the first conveying shaft essentially only in that its helix structure is not left-rotating, but rather right-rotating.

Between the front bearing journal 511a.1 and the conical section 531.1, the first conveying shaft 504.1 additionally comprises a further circular-cylindrical shank section 536.1 which merges steplessly into the conical shank section 531.1. The circular-cylindrical shank section 536.1 and the conical shank section 531.1 form the tapered shank region 537.1 of the conveying shaft 504.1. The outermost smaller shank diameter in the region of the inlet opening 505 enables a particularly uniform loading of the chamber 503 with cheese curd.

In addition, the pitch of the helix 519.1 of the conveying shaft 504.1 is not constant, but rather is greater in the region of the inlet opening 505. This means that, in the region of the inlet opening 505, the axial distance between two helix revolutions is greater. The pitch of the first helix revolution 538.1 is therefore the largest. It is reduced continuously in the tapered shank region 537.1 in the direction of the outlet opening 506. At the transition between the conical shank region 531.1 and the non-tapered, circular-cylindrical shank section 532.1, it reaches the smallest value and remains constant from there. Over approximately the first half of the conveying path 533, the pitch is larger and the shank diameter is smaller than at the circular-cylindrical shank region 532.1. The greater pitch in the region of the inlet opening brings about a more uniform thorough mixing of the cheese mass in this region. Instead of continuous, stepless pitch transitions, in principle discontinuous pitch transmissions are also possible, but continuous, stepless transitions are advantageous for the flow behavior of the cheese mass.

Figure 14:
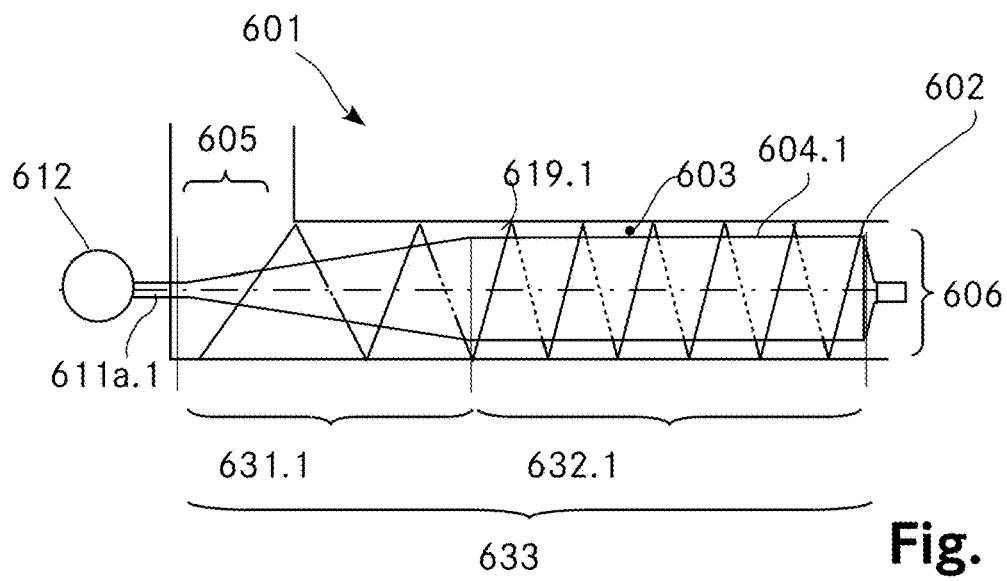
FIG. 14 shows a schematic side view of the device according to a seventh exemplary embodiment of the present teachings.

The device 601, which is depicted schematically in side view in FIG. 14, according to the seventh exemplary embodiment of the present teachings differs from the device 501 of the sixth exemplary embodiment only by the configuration of the shanks of the conveying shafts. Corresponding components in FIG. 14 have reference signs increased by the number three hundred in comparison to the third exemplary embodiment which is illustrated in FIG. 11.

Again, only the first conveying shaft 604.1 is described. The latter has, corresponding to the fourth and fifth exemplary embodiments, a tapered conical section 631.1 and a circular-cylindrical shank section 632.1. However, the length of the conical shank section 631.1 here is approximately 40% of the length of the axial conveying path 633.

Also in this exemplary embodiment, the pitch of the helix 619.1 of the conveying shaft is greater in the region of the inlet opening 605 and in the region of the conical shank section 631.1 than in the region of the circular-cylindrical shank section 632.1, in which the pitch of the helix 619.1 is substantially constant.

Figure 15:
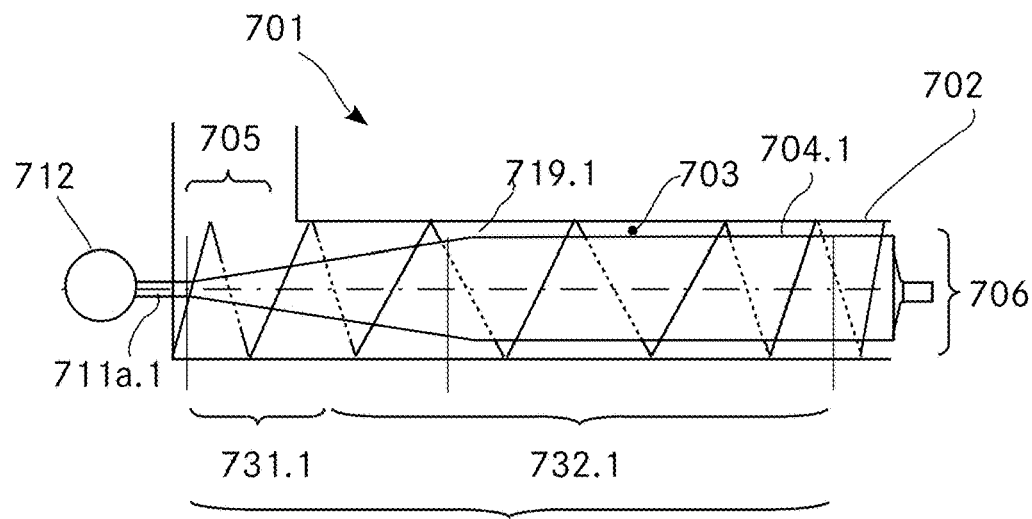
FIG. 15 shows a schematic side view of the device according to an eighth exemplary embodiment of the present teachings.

FIG. 15 shows a device 701 according to an eighth exemplary embodiment of the present teachings in a schematic side view. Parts in FIG. 15 that correspond to the parts of the device 301 of the fourth exemplary embodiment have reference signs increased by the number four hundred in comparison to FIG. 11. The device 701 differs from the device 601 according to the seventh exemplary embodiment exclusively by the form of the helices of the conveying shafts.

In this exemplary embodiment, the pitch of the helix 719.1 of the first conveying shaft 704.1 is smallest in the vicinity of the inlet opening 705 and in the region of the outlet opening 706. It increases toward the center of the elongate chamber 703 of the housing 702 or toward the center of the conveying path 733, i.e. the axial distance between adjacent revolutions of the helix becomes larger toward the center of the chamber. The second conveying shaft, not illustrated here, is correspondingly configured, but has a right-rotating helix instead of a left-rotating helix 719.1.

Figure 16:
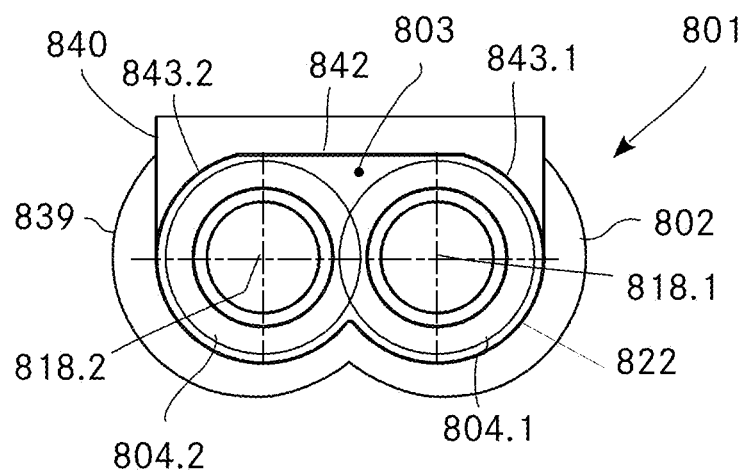
FIG. 16 shows a schematic axial section of the device according to a ninth exemplary embodiment of the present teachings.

FIG. 16 shows a sectional view of the device 801 according to a ninth exemplary embodiment of the present teachings. The device 801 substantially corresponds to the first embodiment, but differs therefrom by a different cross section of the housing 802 which comprises the conveying vat 839 and the cover 840. The sectional illustration illustrated in FIG. 16 is a section which is analogous to FIG. 2d and refers to the section plane AB identified in FIG. 1.

The underside of the cover 840 and the inner side of the conveying vat 839 form the inner circumference 822 of the chamber 803 in which the conveying shafts 804.1 and 804.2 are rotatably mounted. The center of the underside of the cover has a level section 842 which merges toward the two outer sides of the cover tangentially into circular-cylindrical segments 843.1 and 843.2. Said circular-cylindrical segments 843.1 and 843.2 tangentially adjoin the concentric segments 841.1 and 841.2 of the conveying vat 839, which segments are not formed by the cover and run (extend) concentrically with respect to the respective conveying shafts 804.1 and 804.2. The transition between cover and conveying vat on the inner circumference is arranged here in the common plane in which the axes of rotation 818.1 and 818.2 lie. The cover 840 can thus cover the conveying shafts 804.1 and 804.2 over the entire width. The large cover width improves the accessibility of the chamber.

Owing to the design of this embodiment, as in the case of a flat cover, an additional volume arises (is provided) between the envelopes of the conveying shafts 804.1 and 804.2 and the cover 840. This makes it possible for the cheese mass to be thoroughly mixed in the chamber.

Figure 17:
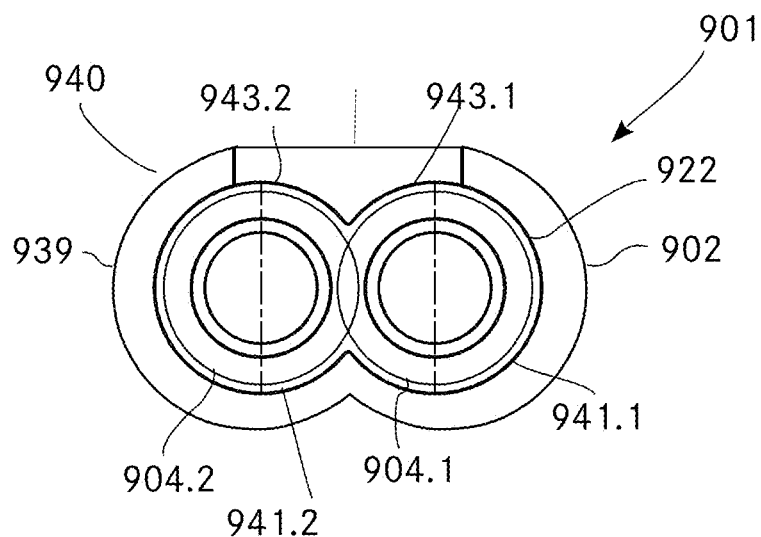
FIG. 17 shows a schematic axial section of the device according to a tenth exemplary embodiment of the present teachings.

FIG. 17 shows a sectional view of the device 901 according to a tenth exemplary embodiment of the present teachings. The device 901 substantially corresponds to that of the first embodiment, but differs therefrom in that the cover 940 of the housing 902 is not level on the underside, but rather the underside thereof has two circular-cylindrical segments 943.1 and 943.2 which, when the cover is closed, are concentric with respect to the two conveying shafts 904.1 and 904.2 and tangentially adjoin the segments 941.1 and 941.2 of the conveying vat 939, which segments are concentric with respect to the conveying shafts 904.1 and 904.2. The inner circumference 922 defined by conveying vat 939 and the cover 940 thus encases the two conveying shafts 904.1 and 904.2. A minimal gap therefore still remains between the envelope of the conveying shafts and the inner circumference. Optimum heating of the cheese mass being conveyed between the inner circumference and the conveying shafts 904.1 and 904.2 is thereby possible.

Figure 18A:
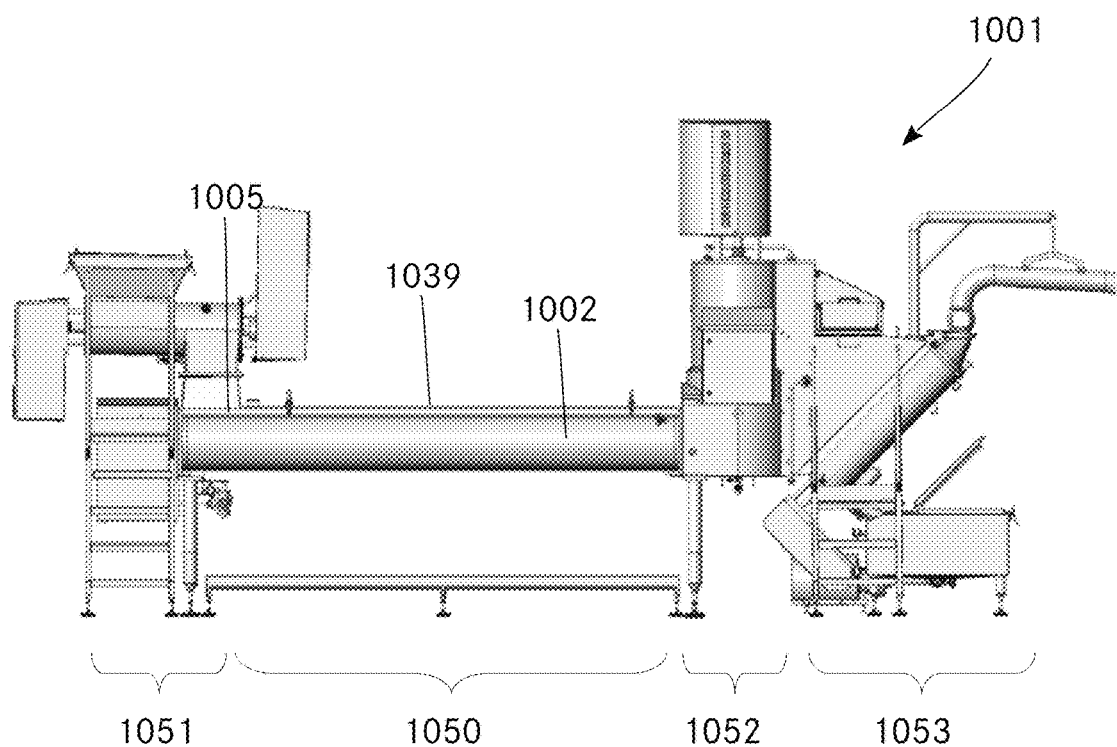
FIGS. 18a and b each show a schematic side view of the device according to an eleventh exemplary embodiment of the present teachings, wherein only the cover of the heatable housing is illustrated in FIG. 18b.
Figure 18B:
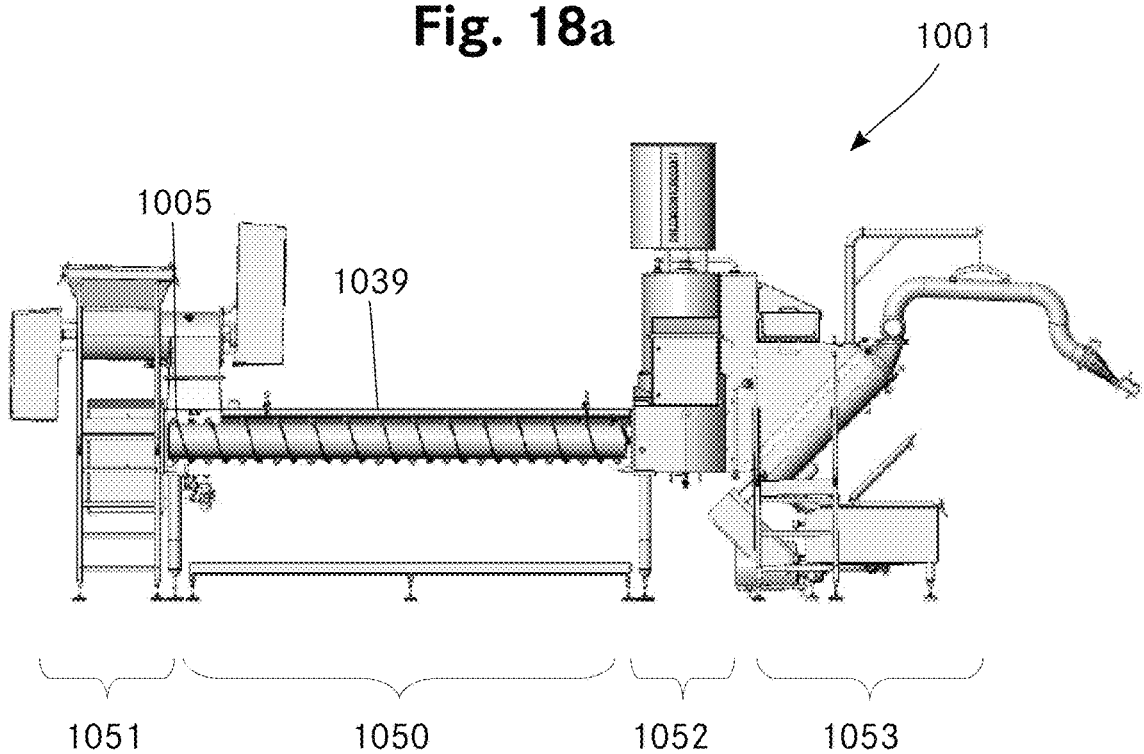

FIGS. 18a and 18b show a device 1001 for continuously conveying and plasticizing cheese curd, according to an eleventh exemplary embodiment of the present teachings. FIG. 18a shows the device 1001 in a side view; FIG. 18b shows the device 1001 in a side view in which only the cover 1039 of the heatable housing 1002 is illustrated. In addition to the stretching unit or indirect cooker 1050 having the heatable housing 1002 and the heatable pair of conveying shafts, the device 1001 comprises, on the side of the inlet opening 1005, a shredder 1051 which provides (cuts) the cheese curd in shreds of a defined size and supplies the diced cheese curds into the heatable chamber of the device, which chamber is formed by the housing 1002, via the inlet opening 1005. In addition, on the outlet side, the device 1001 comprises a kneading device 1052 and a screw conveyor 1053 for further processing, for example a dry salter or a molder.

Comparison tests were carried out in order to verify the action of the entraining means. Test 1 was carried out on a device for conveying and plasticizing cheese curd according to the present teachings, in which the conveying shafts were provided with small metal plates having a size of 40×25 mm. The device used in test 1 differed from the device 1 of the first exemplary embodiment according to FIG. 1 only in that the pitch of the helix was 190 mm instead of 150 mm and correspondingly the number of helix revolutions was reduced from 13½ to 11½.

Test 2 was carried out on the same device, but wherein the conveying shafts did not have any small metal plates.

In both tests, as production was proceeding, the conveying shafts were in each case stopped and the respective flat housing cover opened in order to assess the state of the cheese mass in the chamber of the device by appearance.

Test 1 has revealed that the cheese curd to be plasticized or the cheese mass had rotated together with the conveying shaft owing to the small metal plates 20.1. In test 1, the cheese mass has thus covered the conveying shafts substantially over the entire width (circumference) and completely filled the conveying vat.

By contrast, in test 2, the cheese curd located in the chamber of the machine and to be plasticized was only pushed forward. The cheese curd had accordingly accumulated exclusively between the two conveying shafts mounted rotatably in the chamber. It had therefore not been transported (circumferentially) around the conveying shafts. In test 2, no transverse transport therefore took place either.

The surface of the cheese mass in test 1 was significantly smoother than that of the cheese mass in test 2, which is proof that the cheese in test 1 had melted significantly better.

It should be stated in summary that the present disclosure provides devices and methods which enable the conveying and plasticizing of cheese curd without waste water and cheese ingredient losses, while also achieving a similar quality to traditional water stretching machines.

The invention claimed is:

1. A device for continuously conveying and plasticizing cheese curd, comprising:
    a housing having an elongate chamber with an inlet opening and an outlet opening,
    at least first and second conveying shafts arranged in the elongate chamber to be rotatable in opposite directions and respectively having axes of rotation that extend in parallel in a longitudinal direction of the elongate chamber, the first and second conveying shafts each having a shank with a circular-cylindrical shank section and a helical structure arranged on a circumference of the shank, each of the helical structures having one or more helical turns for axially conveying the cheese curd from the inlet opening to the outlet opening, and the helical structures are interleaved in one another,
    a drive means for driving the first and second conveying shafts in opposite directions, and
    a heating device configured to heat at least part of at least one of the shanks and at least part of an inner circumferential surface of the elongate chamber, wherein:
    the first and second conveying shafts further include at least one entraining means configured to at least partially transport the cheese curd in a circumferential direction around the first and second conveying shafts as the cheese curd is conveyed along an axial direction of the shanks during operation;
    the entraining means comprises a projection on at least one of the first and second conveying shafts, said projection being an element attached to the conveying shaft; and
    the element attached to the at least one of the first and second conveying shafts is a flat element having at least one main surface oriented in such a manner that circumferential lines of the axis of rotation of the at least one of the first and second conveying shafts are substantially perpendicular to the at least one main surface.

2. The device as claimed in claim 1, wherein the element is arranged on the helical structure and/or on the shank of at least one of the first and second conveying shafts.

3. The device as claimed in claim 1, wherein at least one helical turn of the one or more helical turns is a continuous blade.

4. The device as claimed in claim 1, wherein at least one helical turn of the one or more helical turns has interrupted blades and/or one or more bent blades.

5. The device as claimed in claim 4, wherein the projection is a blade edge of an interrupted blade and/or a bent blade section of the bent blade.

6. The device as claimed in claim 1, wherein:
    the inner circumferential surface of the elongate chamber comprises a first segment which is substantially concentric with respect to one of the first or second conveying shafts, and a second segment which is substantially concentric with respect to the other of the first or second conveying shafts, and
    the circular-cylindrical shank sections of the first and second conveying shafts are respectively spaced apart from the first and second segments of the inner circumferential surface of the elongate chamber by a radial distance of 70 mm or less.

7. The device as claimed in claim 6, wherein:
    the housing comprises a cover which closes the elongate chamber and forms part of the inner circumferential surface,
    the cover defines sections of the first and second concentric segments of the inner circumferential surface, and
    said sections, which are defined by the cover, of the first and second segments of the inner circumferential surface that are concentric with respect to the first and second conveying shafts are in contact with one another.

8. The device as claimed in claim 6, wherein the first and second concentric segments of the inner circumferential surface are connected to one another in such a manner that they completely surround the first and second conveying shafts.

9. The device as claimed in claim 1, wherein the elongate chamber is oriented substantially horizontally.

10. The device as claimed in claim 1, wherein the helical structures of the first and second conveying shafts are configured in such a manner that when the first and second conveying shafts are rotated in opposite directions and vertical tangential speed components of the first and second conveying shafts between the axes of rotation are directed upward, the cheese curd is conveyed axially from the inlet opening to the outlet opening.

11. The device as claimed in claim 1, wherein the shank of at least one of the first and second conveying shafts comprises a tapered section directed toward the inlet opening.

12. The device as claimed in claim 11, wherein the tapered section has a length that is one-third or less of a total length L of an axial conveying path in the elongate chamber.

13. The device as claimed in claim 1, wherein the one or more helical turns have sections of differing pitch.

14. The device as claimed in claim 1, wherein a ratio L/D between a total length L of an axial conveying path in the elongate chamber and an outside diameter D of the first and second conveying shafts is 1:1 to 20:1.

15. The device as claimed in claim 1, wherein:
the shank of at least one the first and second conveying shafts and the housing comprise fluid channels for heating the elongate chamber, and
the fluid channels are part of the heating device and extend at least substantially along an entire axial conveying path of the elongate chamber.

16. The device as claimed in claim 1, wherein:
the heating device is configured such that a temperature difference between fluid supplied at a first axial end of the elongate chamber and fluid discharged at a second, opposite axial end of the elongate chamber differs by less than 10° C., and/or a temperature of fluid flowing in a direction from the inlet opening toward the outlet opening is less than 90° C.

17. The device as claimed in claim 1, wherein:
the flat element comprises a first metal plate attached to one of the helical turns of the first conveying shaft; and
a second metal plate is attached to one of the helical turns of the second conveying shaft, the second metal plate being a flat element having at least one main surface oriented in such a manner that circumferential lines of the axis of rotation of the second conveying shaft are substantially perpendicular to the at least one main surface.

18. The device as claimed in claim 17, wherein at least one helical turn of the one or more helical turns is a continuous blade.

19. A method for continuously conveying and plasticizing cheese curd, comprising:
loading the device according to claim 1 with cheese curd via the inlet opening,
conveying the cheese curd along a conveying path between the inlet opening and the outlet opening of the device by rotationally driving the first and second conveying shafts in opposite directions, and
heating the at least part of the inner circumferential surface of the elongate chamber and the conveying shafts using the heating device such that the cheese curd at the outlet opening reaches a temperature of 50° C.-70° C., with the cheese curd being continuously plasticized,
wherein the cheese curd is conveyed continuously not only axially in an axial conveying direction but also circumferentially around the first and second conveying shaft.

20. A device for continuously conveying and plasticizing cheese curd, comprising:
a housing defining an elongate chamber having an inlet opening and an outlet opening,
first and second conveying shafts rotatably disposed in the elongate chamber and having respective axes of rotation that extend in parallel in a longitudinal direction of the elongate chamber, the first and second conveying shafts each having at least one helical blade extending radially from a shank and being configured to axially convey the cheese curd from the inlet opening to the outlet opening, the at least one helical blade of the first conveying shaft being interleaved with the at least one helical blade of the second conveying shaft,
at least one motor configured to rotatably drive the first and second conveying shafts in opposite rotational directions, and
at least one heating device configured to heat at least a portion of at least one of the shanks of the first and second conveying shafts and at least a portion of an inner circumferential surface of the elongate chamber,
wherein:
a first flat element having at least one main surface projects from the at least one helical blade of the first conveying shaft and is oriented such that a plane defined by the at least one main surface of the flat element is parallel to the axis of rotation of the first conveying shaft,
a second flat element having at least one main surface projects from the at least one helical blade of the second conveying shaft and is oriented such that a plane defined by the at least one main surface of the flat element is parallel to the axis of rotation of the second conveying shaft, and
the first and second flat elements are configured to at least partially transport the cheese curd in a circumferential direction around the first and second conveying shafts as the cheese curd is being conveyed along an axial direction of the shanks during operation.

* * * * *